US009488094B2

(12) United States Patent
Yamashita et al.

(10) Patent No.: US 9,488,094 B2
(45) Date of Patent: Nov. 8, 2016

(54) DIRECT INJECTION GASOLINE ENGINE AND METHOD OF CONTROLLING THE DIRECT INJECTION GASOLINE ENGINE

(75) Inventors: Hiroyuki Yamashita, Hiroshima (JP); Kazuaki Narahara, Aki-gun (JP); Tatsuya Tanaka, Higashi-Hiroshima (JP); Yoshitomo Takahashi, Aki-gun (JP); Yusuke Nakao, Hiroshima (JP); Takashi Ikai, Higashi-Hiroshima (JP); Hidefumi Fujimoto, Hiroshima (JP); Masatoshi Seto, Hatsukaichi (JP); Yoshio Tanita, Hiroshima (JP); Kazuo Ichikawa, Hiroshima (JP); Shingo Kai, Aki-gun (JP); Susumu Masuyama, Hiroshima (JP); Hirokazu Nakahashi, Hiroshima (JP); Keiji Araki, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 164 days.

(21) Appl. No.: 14/343,381

(22) PCT Filed: Aug. 28, 2012

(86) PCT No.: PCT/JP2012/005408
§ 371 (c)(1),
(2), (4) Date: Mar. 6, 2014

(87) PCT Pub. No.: WO2013/035272
PCT Pub. Date: Mar. 14, 2013

(65) Prior Publication Data
US 2014/0216396 A1 Aug. 7, 2014

(30) Foreign Application Priority Data

Sep. 7, 2011 (JP) .................................. 2011-195153
Sep. 20, 2011 (JP) .................................. 2011-204570

(51) Int. Cl.
*F02P 5/00* (2006.01)
*F02B 17/00* (2006.01)
(Continued)

(52) U.S. Cl.
CPC ................ *F02B 17/005* (2013.01); *F01L 3/04* (2013.01); *F02B 11/00* (2013.01); *F02D 41/401* (2013.01);
(Continued)

(58) Field of Classification Search
CPC ....... F02B 17/005; F02B 11/00; F02P 5/153; F02P 23/04; F01L 3/04; F01L 2101/02; F01L 2101/00; F02D 41/403; F02D 41/401; F02D 41/3035; F02D 2200/025; F02F 3/12; Y02T 10/46; Y02T 10/44
USPC ................... 123/295, 299, 435, 305, 406.22, 123/406.42, 406.43; 701/102–105
See application file for complete search history.

(56) References Cited

U.S. PATENT DOCUMENTS 7,194,996 B2 * 3/2007 Koopmans .......... F02D 41/0002
123/295
7,802,556 B2 * 9/2010 Ohtsubo ................... F02B 1/14
123/406.47

(Continued)

FOREIGN PATENT DOCUMENTS

CN 101858267 A 10/2010
CN 102057151 A 5/2011
(Continued)

OTHER PUBLICATIONS

International Search Report; PCT/JP2012/005408; Oct. 2, 2012.

*Primary Examiner* — Joseph Dallo
(74) *Attorney, Agent, or Firm* — Studebaker & Brackett PC

(57) ABSTRACT

A direct injection engine includes an ignition assistance section applying energy to fuel injected into a cylinder using an injector to assist auto-ignition combustion of the fuel when the engine is within an auto-ignition combustion operation range. A start time of fuel injection is set within a period from a terminal stage of a compression stroke to a compression top dead center. The energy is applied to the fuel injected into the cylinder in a period from start of the fuel injection to an initial stage of an expansion stroke such that a time of a specific crank angle when an increase rate of in-cylinder pressure, which is a ratio of a change in the in-cylinder pressure to a change in a crank angle in motoring the engine, reaches a negative maximum value overlaps a combustion period when a combustion mass percentage of the fuel ranges from 10% to 90%.

14 Claims, 9 Drawing Sheets

(51) Int. Cl.
*F02B 11/00* (2006.01)
*F02F 3/12* (2006.01)
*F02D 41/40* (2006.01)
*F01L 3/04* (2006.01)
*F02P 5/153* (2006.01)
*F01L 1/34* (2006.01)
*F01L 13/00* (2006.01)
*F02D 41/30* (2006.01)
*F02P 23/04* (2006.01)

(52) U.S. Cl.
CPC .............. *F02D 41/403* (2013.01); *F02F 3/12* (2013.01); *F02P 5/153* (2013.01); *F01L 1/34* (2013.01); *F01L 13/0015* (2013.01); *F01L 2101/00* (2013.01); *F01L 2101/02* (2013.01); *F02D 41/3035* (2013.01); *F02D 2200/025* (2013.01); *F02P 23/04* (2013.01); *Y02T 10/44* (2013.01); *Y02T 10/46* (2013.01)

(56) References Cited

U.S. PATENT DOCUMENTS

| | | | | |
|---|---|---|---|---|
| 7,845,335 | B2* | 12/2010 | Yun | F02B 1/12 123/406.55 |
| 8,677,975 | B2* | 3/2014 | Auclair | F02D 19/12 123/435 |
| 2002/0011233 | A1* | 1/2002 | Shiraishi | F01L 9/04 123/294 |
| 2006/0065235 | A1* | 3/2006 | Tomita | F02D 37/02 123/305 |
| 2006/0266326 | A1* | 11/2006 | Yasunaga | F02D 37/02 123/299 |
| 2007/0028889 | A1* | 2/2007 | Ogawa | F02D 13/0253 123/295 |
| 2007/0062483 | A1* | 3/2007 | Yang | F02D 35/025 123/295 |
| 2007/0062486 | A1* | 3/2007 | Yang | F02B 11/00 123/305 |
| 2007/0113827 | A1* | 5/2007 | Moriya | F02D 13/0203 123/435 |
| 2007/0181096 | A1* | 8/2007 | Wagner | F02D 13/0261 123/299 |
| 2007/0193545 | A1* | 8/2007 | Brevick | F02D 41/0082 123/179.5 |
| 2007/0204830 | A1* | 9/2007 | Andri | B60K 6/445 123/198 F |
| 2007/0204838 | A1* | 9/2007 | Leone | B60K 6/445 123/518 |
| 2007/0265763 | A1* | 11/2007 | Akazaki | F02D 41/1405 701/103 |
| 2007/0272203 | A1* | 11/2007 | Sloane | F02B 17/005 123/295 |
| 2007/0289571 | A1* | 12/2007 | Petridis | F02B 1/12 123/305 |
| 2007/0289572 | A1* | 12/2007 | Petridis | F02D 35/025 123/305 |
| 2008/0053405 | A1* | 3/2008 | Vigild | F02D 35/027 123/406.26 |
| 2008/0066713 | A1* | 3/2008 | Megli | F01L 9/04 123/295 |
| 2008/0127933 | A1* | 6/2008 | Blumberg | F02B 11/00 123/304 |
| 2008/0140300 | A1* | 6/2008 | Kuo | F02B 17/00 701/113 |
| 2008/0201056 | A1* | 8/2008 | Moriya | F02D 35/023 701/103 |
| 2008/0270004 | A1* | 10/2008 | Kuo | F02D 13/0203 701/103 |
| 2008/0271436 | A1* | 11/2008 | Najt | F01N 3/2006 60/285 |
| 2009/0164104 | A1* | 6/2009 | Wermuth | F02D 41/3041 701/105 |
| 2009/0182485 | A1* | 7/2009 | Loeffler | F02D 35/023 701/103 |
| 2009/0259387 | A1* | 10/2009 | Kakuya | F02D 13/0265 701/103 |
| 2009/0320788 | A1* | 12/2009 | Ohtsubo | F02B 1/14 123/295 |
| 2010/0077992 | A1* | 4/2010 | Auclair | F02D 19/12 123/435 |
| 2010/0242899 | A1* | 9/2010 | Hitomi | F02D 41/3035 123/299 |
| 2011/0056459 | A1 | 3/2011 | Nada | |
| 2011/0067679 | A1 | 3/2011 | Hitomi et al. | |
| 2011/0079193 | A1* | 4/2011 | Shibata | F02D 41/3035 123/295 |
| 2011/0108001 | A1* | 5/2011 | Lee | F02B 17/005 123/305 |
| 2011/0180035 | A1* | 7/2011 | Durrett | F02B 17/005 123/295 |
| 2011/0315114 | A1* | 12/2011 | Hammond | F02D 41/18 123/435 |
| 2013/0197781 | A1* | 8/2013 | Shin | F02D 41/2438 701/103 |

FOREIGN PATENT DOCUMENTS

| | | |
|---|---|---|
| JP | H02-99736 A | 4/1990 |
| JP | 09-217627 A | 8/1997 |
| JP | 11-294245 A | 10/1999 |
| JP | 2000-104608 A | 4/2000 |
| JP | 2008-121429 A | 5/2008 |
| JP | 2008169714 A * | 7/2008 |
| JP | 2009108780 A * | 5/2009 |
| JP | 2009-243355 A | 10/2009 |
| JP | 2010-190061 A | 9/2010 |
| JP | 2010-236467 A | 10/2010 |

* cited by examiner

DIRECT INJECTION GASOLINE ENGINE AND METHOD OF CONTROLLING THE DIRECT INJECTION GASOLINE ENGINE

TECHNICAL FIELD

The present disclosure relates to direct injection gasoline engines and methods of controlling the direct injection gasoline engines.

BACKGROUND ART

For example, Patent Document 1 shows an engine, in which a combustion chamber is segmented into a central combustion chamber and a main combustion chamber by a cavity recessed at the lower surface of each cylinder head and a protrusion raised at the top surface of a piston to increase the theoretical thermal efficiency of a spark ignition gasoline engine. The combustion chamber has a high compression ratio of about 16 as a whole. The central combustion chamber contains a relatively rich air-fuel mixture and the main combustion chamber contains a relatively lean air-fuel mixture so that the combustion chamber contains a lean air-fuel mixture as a whole.

For example, Patent Document 2 teaches that a surface segmenting a combustion chamber of an engine is made of a cellular heat insulating material in view of improving the thermal efficiency by reducing cooling loss. In Patent Document 2, the engine has a compression ratio of 16.

CITATION LIST

Patent Document

PATENT DOCUMENT 1: Japanese Patent Publication No. H9-217627
PATENT DOCUMENT 2: Japanese Patent Publication No. 2009-243355

SUMMARY OF THE INVENTION

Technical Problem

As described in Patent Document 1, as the compression ratio of the engine increases, the maximum in-cylinder pressure rises in motoring of the engine. At the same time, the maximum value and the minimum value (i.e., the maximum negative value) of the increase rate of the in-cylinder pressure, which is the ratio of a change in the in-cylinder pressure to a change in a crank angle, increase.

Assume that the compression ratio of the engine increases to cause auto-ignition combustion of fuel. If the auto-ignition combustion starts before the compression top dead center, the fuel is combusted at a crank angle with a high increase rate of the in-cylinder pressure in motoring. This largely increases the maximum increase rate of the in-cylinder pressure in the combustion, thereby raising a noise, vibration, and harshness (what is called NVH) level. The noise, vibration, and harshness (NVH) level is more largely influenced by the increase rate of the in-cylinder pressure than the in-cylinder pressure itself.

The present disclosure is made in view of the problem. It is an objective of the present disclosure to reduce the increase rate of the in-cylinder pressure in auto-ignition combustion of fuel injected into the cylinder, thereby reducing the noise, vibration, and harshness (NVH) level as much as possible.

Solution to the Problem

In order to achieve the objective, the present disclosure provides a direct injection gasoline engine having an auto-ignition combustion operation range allowing auto-ignition combustion of fuel injected into a cylinder by an injector and containing at least gasoline. The engine has a geometric compression ratio ranging from 18 to 40, both inclusive. The engine includes an injection control section configured to control fuel injection of the injector; and an ignition assistance section configured to apply energy to the fuel injected into the cylinder by the injector to assist the auto-ignition combustion of the fuel, when the engine is within the auto-ignition combustion operation range. When the engine is within the auto-ignition combustion operation range, the injection control section sets a start time of the fuel injection within a period from a terminal stage of a compression stroke to a compression top dead center. The ignition assistance section applies the energy to the fuel injected into the cylinder in a period from start of the fuel injection to an initial stage of an expansion stroke such that a time of a specific crank angle ranging from 4° CA to 15° CA after the compression top dead center when an increase rate of in-cylinder pressure, which is a ratio of a change in the in-cylinder pressure to a change in a crank angle in motoring the engine, reaches a negative maximum value overlaps a main combustion period when a combustion mass percentage of the fuel ranges from 10% to 90%, both inclusive.

With this configuration, the fuel injection starts within the period from the terminal stage of the compression stroke to the compression top dead center. Within the period from the start of the fuel injection to the initial stage of the expansion stroke (usually in the period until all fuel is completely injected), the ignition assistance section operates to apply the energy to the fuel, which has been injected into the cylinder by the time of the operation. Then, the temperature of the fuel applied with the energy rises to ignite the fuel. The ignited fuel servers as a trigger to successively ignite the fuel, which will be injected later. As such, by providing the ignition assistance section, the auto-ignition combustion of the fuel is easily made even after the compression top dead center. In addition, the time of the specific crank angle when the increase rate of the in-cylinder pressure in motoring reaches the negative maximum value overlaps the main combustion period when the combustion mass percentage ranges from 10% to 90%, both inclusive. This reduces the increase rate of the in-cylinder pressure in combustion, thereby lowering the noise, vibration, and harshness (NVH) level.

Where the geometric compression ratio ranges from 18 to 40, both inclusive, the specific crank angle falls within a range from 4° CA to 15° CA after the compression top dead center.

In the direct injection gasoline engine, the ignition assistance section may apply the energy to the fuel injected into the cylinder such that a time when the combustion mass percentage of the fuel is 10% comes after the compression top dead center.

With this configuration, the main combustion period comes after the compression top dead center, thereby reducing cooling loss in the combustion at the expansion stroke.

In the direct injection gasoline engine, when the engine is within the auto-ignition combustion operation range, the injection control section may perform first injection injecting a predetermined amount of the fuel, and perform second injection injecting remaining fuel continuously or discontinuously after the first injection. The ignition assistance section applies the energy to the fuel for the first injection within a period from a terminal stage of the first injection to an initial stage of the second injection.

This appropriately sets the predetermined amount (for example, set to one or lower mass % of the total injected fuel) to form a fine air-fuel mixture mass. Energy is intensively applied to this fine air-fuel mixture mass (i.e., the fuel for the first injection), thereby reliably igniting the fuel for the first injection. This fuel for the first injection serves as a trigger of ignition to successively ignite the fuel for the second injection. As a result, the ignition characteristics of the fuel improve.

In the direct injection gasoline engine, the ignition assistance section may apply the energy to the fuel injected into the cylinder by plasma ignition.

The plasma ignition applies greater energy into the fuel than spark ignition, which is advantageous in improving the ignition stability of fuel.

In the Otto cycle, which is the theoretical cycle of spark ignition engines, the theoretical thermal efficiency improves with an increase in the compression ratio of the engines, and with an increase in the heat ratio of gas. A combination of a higher compression ratio and a leaner air-fuel mixture shown in Patent Document 1 is advantageous in improving the thermal efficiency (i.e., the indicated thermal efficiency) to some extent. Out of them, a leaner air-fuel mixture is studied. When the engine is in the low load operation range, a relatively small amount of the fuel is injected. Thus, a lean air-fuel mixture at an excess air ratio $\lambda$ of, for example, two or higher is used to improve the thermal efficiency and reduce generation of RawNOx. On the other hand, when the engine is in the high load operation range, the amount of the fuel injection increases, and it is thus difficult to maintain the excess air ratio $\lambda$ of two or higher. When the excess air ratio $\lambda$ is set lower than two, the excess air ratio $\lambda$ needs to be one or lower for utilizing a three-way catalyst. Therefore, changing the excess air ratio $\lambda$ from $\lambda \leq 1$ in the high load operation range to $\lambda \geq 2$ in the low load operation range in accordance with the load of the engine is considered.

However, in the transition from the low load operation range at the excess air ratio of $\lambda \geq 2$ to the high load operation range at the excess air ratio of $\lambda \leq 1$ in response to acceleration request made by, for example, accelerator operation, the control for reducing the intake amount lags behind the change in the excess air ratio $\lambda$. Thus, there is a need to rapidly reduce the excess air ratio $\lambda$ by control for increasing the amount of the fuel injection. This causes a rapid change in torque, which leads to torque shock and degradation in the NVH performance. In particular, in a high compression ratio engine at a high geometric compression ratio, a great torque difference occurs between the low load operation range at the excess air ratio of $\lambda \geq 2$, and the high load operation range at the excess air ratio of $\lambda \leq 1$, thereby significantly causing torque shock and degradation in the NVH performance.

The injection control section may set an excess air ratio $\lambda$ in the combustion to two or higher, when the engine is within a low load operation range with a load lower than a predetermined load, and set the excess air ratio $\lambda$ in the combustion to one or lower, and sets the fuel injection using the injector within a specific injection time around the compression top dead center such that the main combustion period includes the time of the specific crank angle, when the engine is within a high load operation range with a load higher than the predetermined load. The injection control section may execute transition control setting the excess air ratio $\lambda$ in the combustion to one or lower, and delaying the fuel injection from the specific injection time such that the main combustion period is retarded relative to the specific crank angle, in transition when the engine shifts between the low load operation range and the high load operation range.

With this configuration, the transition time when the engine shifts between the low load operation range at the excess air ratio of $\lambda \geq 2$, and the high load operation range at the excess air ratio of $\lambda \leq 1$ is more specifically divided as follows. In the transition from the low load operation range to the high load operation range, the time is immediately after shifting to the high load operation range at the excess air ratio of $\lambda \leq 1$. In the transition from the high load operation range to the low load operation range, the time is immediately before shifting to the low load operation range at the excess air ratio of $\lambda \geq 2$. At these transition times, the excess air ratio $\lambda$ in the combustion is set to one or lower to reduce deterioration in the emission performance. The fuel injection is delayed from the specific injection time, thereby executing the transition control retarding the main combustion period relative to the specific crank angle. Since the main combustion period is largely retarded to reduce the combustion efficiency, a small amount of torque is generated even at the excess air ratio of $\lambda \leq 1$.

For example, like the time when acceleration is requested by accelerator operation, in the transition from the low load operation range to the high load operation range, the fuel injection is largely delayed immediately after entering the high load operation range to largely retard the main combustion period. This reduces torque, and reduces or eliminates a torque difference from the low load operation range at the excess air ratio of $\lambda \geq 2$. After that, the largely retarded fuel injection is gradually advanced toward the specific injection time. Then, the main combustion period is advanced relative to the specific crank angle to improve the combustion efficiency. This gradually increases the torque. Eventually, the transition control ends while the main combustion period includes the time of the specific crank angle. As a result, the transition from the low load operation range to the high load operation range is complete while reducing torque shock and degradation in the NVH performance.

On the contrary, in the transition control in transition from the high load operation range to the low load operation range, the fuel injection may be gradually delayed from the specific injection time, while maintaining the excess air ratio at $\lambda \leq 1$, immediately before shifting to the low load operation range. This gradually reduces the torque, and changes the excess air ratio to $\lambda \geq 2$ while reducing or eliminating a torque difference from the low load operation range at the excess air ratio of $\lambda \geq 2$.

When the engine is within the high load operation range, the injection control section preferably sets the start time of the fuel injection within the period from the terminal stage of the compression stroke to the compression top dead center. The ignition assistance section preferably applies the energy to the fuel injected into the cylinder within the period from the start of the fuel injection to the initial stage of the expansion stroke to allow the auto-ignition combustion of the fuel.

In the transition control, the injection control section may allow the injector to execute pre-injection starting within the period from the terminal stage of the compression stroke to the compression top dead center, and main injection after the pre-injection behind the specific injection time.

As described above, in the transition control, the main combustion period is largely retarded in the expansion stroke after the compression top dead center, thereby reducing the combustion stability. Degradation in the ignition characteristics of compression self-ignition is also problematic.

Thus, in the transition control, fuel injection is performed twice. Pre-injection starting the fuel injection at a relatively earlier stage, specifically, within the period from the terminal stage of the compression stroke to the compression top dead center, and the main injection after the pre-injection. The pre-injection contributes a temperature rise in the cylinder to improve the combustion stability of the fuel injected by the main injection, and to improve the ignition characteristics of the compression ignition of the fuel injected by the main injection.

The ignition assistance section may apply the energy to the fuel injected into the cylinder between the pre-injection and the main injection.

Specifically, after the fuel is injected into the cylinder by the pre-injection, the ignition assistance section applies the energy to the fuel. Then, the temperature of the fuel rises to ignite the fuel, thereby increasing the temperature and the pressure in the cylinder. This maintains the temperature and the pressure in the cylinder high, even after the compression top dead center to allow stable self-ignition of the fuel injected by the main injection, which has been largely retarded in the expansion stroke. As such, in the transition control largely retarding the main combustion period in the expansion stroke, the ignition characteristics and the combustion stability of the fuel improve.

The injection control section may execute the transition control in transition when the engine shifts from the low load operation range to a full load range within the high load operation range. Control for reducing an intake amount may be performed while the injection control section executes the transition control in transition when the engine shifts from the low load operation range to a point of the high load operation range with a load lower than a full load.

The low load operation range at the excess air ratio of $\lambda \geq 2$ requires no reduction in the intake amount, since the throttle valve can be fully open. On the other hand, the high load operation range at the excess air ratio of $\lambda \leq 1$ except for the full load range requires reduction in the intake amount by controlling the opening degree of the throttle valve in accordance with the amount of the fuel injection corresponding to the load. In the full load range, the throttle valve is fully open.

Thus, when the engine shifts from the low load operation range to the full load range within the high load operation range, there is no need to reduce the intake amount even in the transition control, since the throttle valve is fully open in the full load range as described above. The transition control controlling at least the timing of the fuel injection suffices. On the other hand, when the engine shifts from the low load operation range to a point of the high load operation range with a load lower than a full load, there is a need to reduce the intake amount after completion of the transition as described above. This requires the control for reducing the intake amount during the transition control. In the transition control at the excess air ratio of $\lambda \leq 1$, the amount of the fuel injection can be reduced in accordance with the reduction in the intake amount, which is advantageous in improving the energy efficiency.

The present disclosure also provides a method of controlling a direct injection gasoline engine including a cylinder set at a geometric compression ratio ranging from 18 to 40, both inclusive, and configured to directly inject fuel containing at least gasoline into the cylinder.

The method includes starting fuel injection into the cylinder in a period from a terminal stage of a compression stroke to a compression top dead center; applying energy to the fuel injected into the cylinder in a period from start of the fuel injection to an initial stage of an expansion stroke such that a time of a specific crank angle ranging from 4° CA to 15° CA after the compression top dead center when an increase rate of in-cylinder pressure, which is a ratio of a change in the in-cylinder pressure to a change in a crank angle in motoring the engine, reaches a negative maximum value overlaps a main combustion period when a combustion mass percentage of the fuel ranges from 10% to 90%, both inclusive; and allowing auto-ignition combustion of the fuel injected into the cylinder.

The method may further include operating the engine such that an excess air ratio $\lambda$ in combustion is two or higher, when the engine is within a low load operation range with a load lower than a predetermined load; operating the engine such that the excess air ratio $\lambda$ in the combustion is one or lower, and such that the main combustion period includes the time of the specific crank angle by setting the fuel injection into the cylinder within a specific injection time around the compression top dead center, when the engine is within a high load operation range with a load higher than the predetermined load; and operating the engine such that the main combustion period is retarded relative to the specific crank angle by executing transition control setting the excess air ratio $\lambda$ in the combustion to one or lower, and delaying the fuel injection from the specific injection time, in transition when the engine shifts between the low load operation range and the high load operation range.

The method may further include setting the start time of the fuel injection within the period from the terminal stage of the compression stroke to the compression top dead center, when the engine is within the high load operation range; and applying the energy to the fuel injected into the cylinder within the period from the start of the fuel injection to the initial stage of the expansion stroke to allow the auto-ignition combustion of the fuel.

The method may further include in the transition control, executing, as the fuel injection into the cylinder, pre-injection starting within the period from the terminal stage of the compression stroke to the compression top dead center, and main injection after the pre-injection behind the specific injection time; and applying the energy to the fuel injected into the cylinder between the pre-injection and the main injection.

The method further includes executing the transition control in transition when the engine shifts from the low load operation range to a full load range within the high load operation range; and performing control for reducing an intake amount during the transition control in transition when the engine shifts from the low load operation range to a point of the high load operation range with a load lower than a full load.

Advantages of the Invention

As described above, the direct injection gasoline engine and the method of controlling the direct injection gasoline engine reduce the increase rate of the in-cylinder pressure in combustion, thereby reducing the noise, vibration, and harshness (NVH) level.

DESCRIPTION OF EMBODIMENTS

Figure 1:
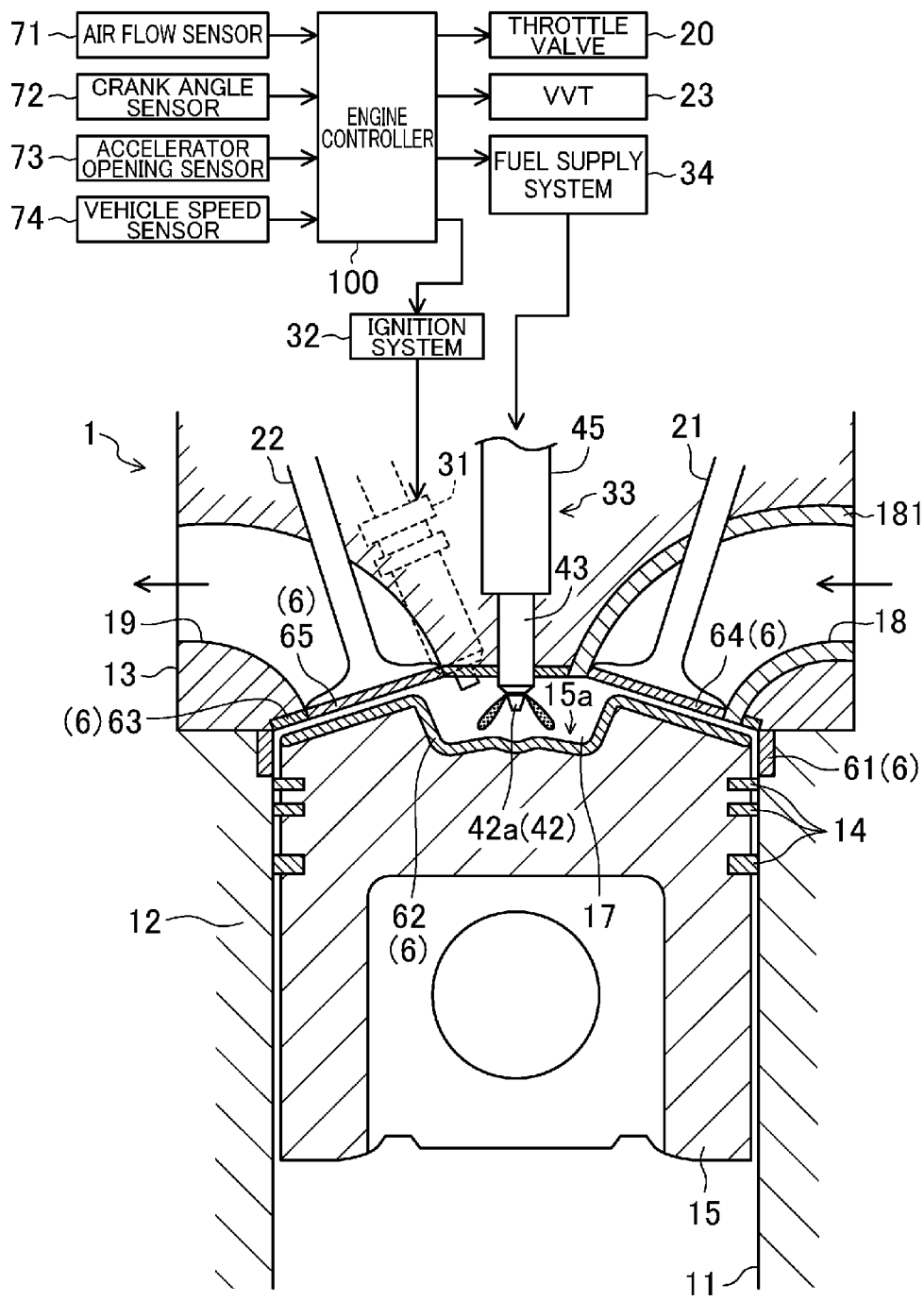
FIG. 1 is a schematic view illustrating a direct injection gasoline engine.

An embodiment of a direct injection gasoline engine will be described hereinafter with reference to the drawings. FIG. 1 schematically illustrates a direct injection gasoline engine 1 (hereinafter simply referred to as an engine 1). The engine 1 includes various actuators associated with an engine body, various sensors, and an engine controller 100 controlling the actuators based on signals from the sensors.

The engine 1 is mounted in the vehicle such as an automobile. Although not shown, the output axis is connected to drive wheels via a transmission. The output of the engine 1 is transmitted to the drive wheels so that the vehicle moves forward. The engine body of the engine 1 includes a cylinder block 12, and a cylinder head 13 mounted on the cylinder block 12. A plurality of cylinders 11 are formed inside the cylinder block 12. (FIG. 1 shows only one of the cylinders 11). Although not shown, a water jacket, in which cooling water flows, is formed inside the cylinder block 12 and the cylinder head 13.

A piston 15 is slidably inserted in each of the cylinders 11. The piston 15 segments a combustion chamber 17 together with the cylinder 11 and the cylinder head 13. In the example figure, the combustion chamber 17 is of what is called a pent roof type. The ceiling surface (i.e., the lower surface of the cylinder head 13) includes two inclined surfaces at the intake side and the exhaust side to form a triangle roof. The top surface of the piston 15 is in a recessed form corresponding to the ceiling surface. A recessed cavity 15a is formed in the center of the top surface. Note that the ceiling surface and the top surface of the piston 15 may be in any form, as long as a below-described high geometric compression ratio can be provided. For example, both of the ceiling surface and the top surface of the piston 15 (i.e., the portion except for the cavity 15a) may be planes perpendicular to the central axis of the cylinder 11. While the ceiling surface may form the triangular roof as above, the top surface of the piston 15 (i.e., the portion except for the cavity 15a) may be a plane perpendicular to the central axis of the cylinder 11.

Although FIG. 1 shows only one, two intake ports 18 are formed at the cylinder head 13 in each cylinder 11. Each of the intake ports 18 is open at the lower surface of the cylinder head 13 (i.e., at the inclined portion of the ceiling surface of the combustion chamber 17 at the intake side) to be communicated to the combustion chamber 17. Similarly, two exhaust ports 19 are formed at the cylinder head 13 in each cylinder 11. Each of the exhaust ports 19 is open at the lower surface of the cylinder head 13 (i.e., at the inclined portion of the ceiling surface of the combustion chamber 17 at the exhaust side) to be communicated to the combustion chamber 17. Each intake port 18 is connected to an intake passage (not shown) which allows flow of fresh air introduced from the corresponding cylinder 11. The intake passage is provided with a throttle valve 20 controlling an intake flow rate. The opening of the throttle valve 20 is controlled in response to a control signal from the engine controller 100. On the other hand, each exhaust port 19 is connected to an exhaust passage (not shown) which allows flow of burnt gas (i.e., exhaust gas) from the corresponding cylinder 11. Although not shown, the exhaust passage is provided with an exhaust gas purifying system including one or more catalyst converter(s). The catalyst converter contains a three-way catalyst.

The cylinder head 13 is provided with an intake valve 21 and an exhaust valve 22 for shutting off the intake ports 18 and the exhaust ports 19 from the combustion chamber 17. The intake valve 21 is driven by an intake valve drive mechanism. The exhaust valve 22 is driven by an exhaust valve drive mechanism. The intake valve 21 and the exhaust valve 22 reciprocate at predetermined timing to open and close the intake ports 18 and the exhaust ports 19, respectively, thereby exchanging gas in the cylinder 11. Although not shown, the intake valve drive mechanism and the exhaust valve drive mechanism include an intake camshaft and an exhaust camshaft, respectively, which are drive-connected to a crankshaft. These camshafts rotate in synchronization with the rotation of the crankshaft. At least the intake valve drive mechanism includes a hydraulic or mechanical variable valve timing (VVT) mechanism 23 capable of continuously changing the phase of the intake camshaft within a predetermined angle range. A continuous variable valve lift (CVVL) mechanism capable of continuously changing the valve lift amount may be included together with the VVT mechanism 23.

The cylinder head 13 is provided with a spark plug 31. This spark plug 31 is fixed to the cylinder head 13 via a known structure such as screws. In the example figure, the spark plug 31 is fixed to the central axis of the cylinder 11 to be inclined to the exhaust side. The tip portion of the spark plug 31 faces the ceiling portion of the combustion chamber 17. The tip portion of the spark plug 31 is located near a nozzle port 41 of an injector 33, which will be described later. The location of the spark plug 31 is not limited thereto. In this embodiment, the spark plug 31 is of a plasma ignition type, and an ignition system 32 includes a plasma generation circuit. The spark plug 31 allows the ignition system 32 to discharge electricity to generate plasma. The plasma is injected as jet into the cylinder from the tip portion of the spark plug 31, thereby igniting fuel. The spark plug 31 functions to assist auto-ignition combustion of the fuel in an auto-ignition combustion operation range allowing the auto-ignition combustion of the fuel, as will be described later. The ignition system 32 receives a control signal from the engine controller 100, and allows electrical conduction to the spark plug 31 so that the spark plug 31 generates plasma at desired ignition timing. The spark plug 31 is not limited to the plasma ignition type, and may be of a commonly used spark ignition type.

Along the central axis of the cylinder 11, the cylinder head 13 is provided with the injector 33 directly injecting the fuel into the cylinder (i.e., into the combustion chamber 17). The injector 33 is fixed to the cylinder head 13 by a known structure such as brackets. The tip of the injector 33 faces to the center of the ceiling portion of the combustion chamber 17.

Figure 2:
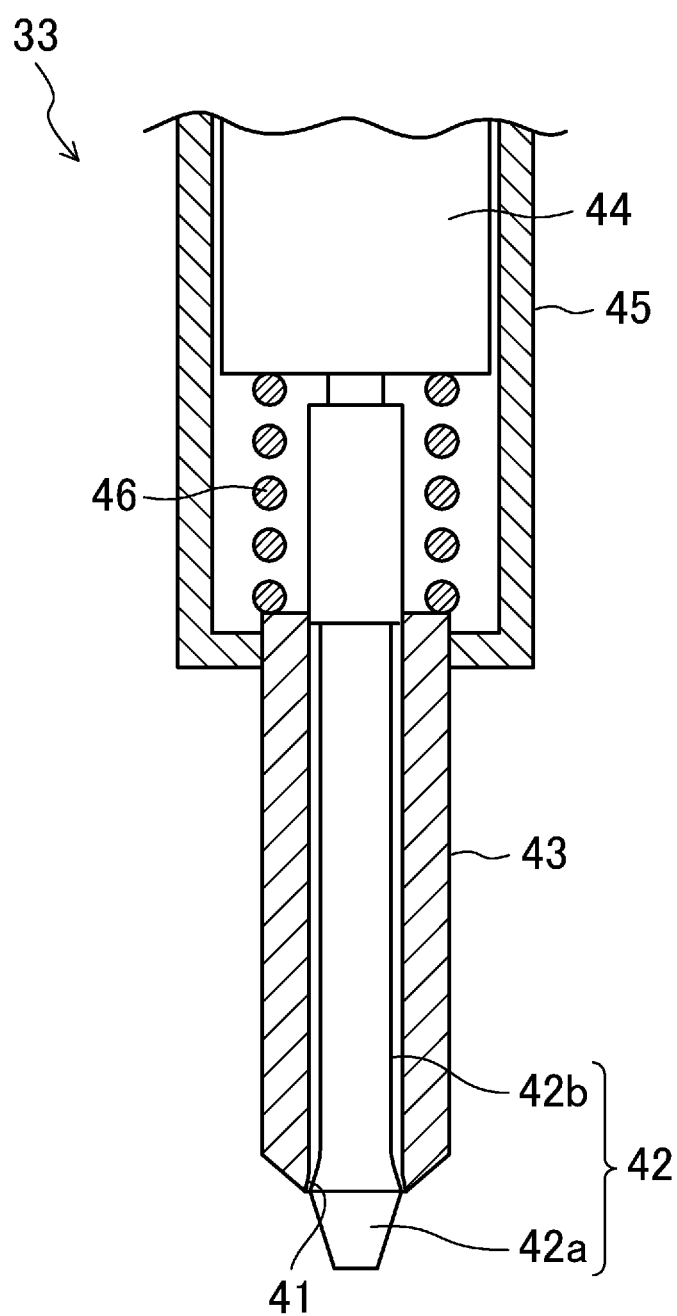
FIG. 2 is a cross-sectional view illustrating the internal structure of an injector.

As shown in FIG. 2, the injector 33 is of an outward opening valve type including an outward opening valve 42 opening and closing the nozzle port 41 for injecting the fuel into the cylinder. The nozzle port 41 is an inverse taper shape, in which the diameter gradually increases at the tip of a fuel pipe 43 extending along the central axis of the cylinder 11. The end of the base of the fuel pipe 43 is connected to a case 45 provided with a piezoelectric element 44 inside. The outward opening valve 42 includes a valve body 42*a*, and a connecting portion 42*b* extending from the valve body 42*a* to be connected to the piezoelectric element 44 through the fuel pipe 43. The portion of the valve body 42*a* at the connecting portion 42*b* has substantially the same shape as the nozzle port 41. When this portion abuts on (i.e., is set on) the nozzle port 41, the nozzle port 41 is closed. At this time, the tip portion of the valve body 42*a* protrudes outside the fuel pipe 43.

The piezoelectric element 44 is deformed by voltage application to press the outward opening valve 42 toward the combustion chamber 17 along the central axis of the cylinder 11, thereby lifting up the outward opening valve 42 from the position closing the nozzle port 41 to open the nozzle port 41. At this time, the fuel is injected in the form of a cone (specifically a hollow cone) around the central axis of the cylinder 11, from the nozzle port 41 into the cylinder. In this embodiment, the taper angle of the cone ranges from 90° to 100°. (The taper angle of the hollow portion inside the hollow cone is about 70°.) When the voltage application to the piezoelectric element 44 stops, the piezoelectric element 44 returns to the original shape so that the outward opening valve 42 closes the nozzle port 41. At this time, a compression coil spring 46 provided around the connecting portion 42*b* inside the case 45 assists the piezoelectric element 44 to return.

As the voltage applied to the piezoelectric element 44 increases, the lift amount of the outward opening valve 42 from the position closing the nozzle port 41 (hereinafter simply referred to as a lift amount) increases. With the increasing lift amount, the opening degree of the nozzle port 41 increases. This increases (i.e., extends) the penetration of the fuel spray from the nozzle port 41 into the cylinder, the amount of the fuel injected per unit time, and the sizes of the particles of the sprayed fuel. The piezoelectric element 44 responses quickly to easily perform first injection and second injection, which will be described later. The means for driving the outward opening valve 42 is not limited to the piezoelectric element 44.

A fuel supply system 34 includes an electrical circuit for driving the outward opening valve 42 (i.e., the piezoelectric element 44) and a fuel supply section supplying the fuel to the injector 33. The engine controller 100 outputs an injection signal being a voltage corresponding to the lift amount to the electrical circuit at predetermined timing, thereby operating the piezoelectric element 44 and the outward opening valve 42 via the electrical circuit. Then, a desired amount of the fuel is injected into the cylinder. When the injection signal is not output (i.e., when the injection signal has a voltage of zero), the nozzle port 41 is closed by the outward opening valve 42. As such, the operation of the piezoelectric element 44 is controlled by the injection signal from the engine controller 100. The engine controller 100 controls the operation of the piezoelectric element 44, thereby controlling the fuel injection from the nozzle port 41 of the injector, and the lift amount in the fuel injection.

Although not shown, the fuel supply section is provided with a high-pressure fuel pump and a common rail. The high-pressure fuel pump feeds the fuel supplied from the fuel tank to the common rail via a low-pressure fuel pump using pressure. The common rail stores the fed fuel by predetermined pressure of the fuel. Then, the injector 33 operates (i.e., the outward opening valve 42 is lifted), thereby injecting the fuel stored in the common rail from the nozzle port 41.

While in this embodiment, an example has been described where the fuel of the engine 1 is gasoline, the gasoline may contain bioethanol, etc. Any fuel may be used, as long as it is liquid fuel containing at least gasoline.

The engine controller 100 is a controller including a known microcomputer as a basis. It further includes a central processing unit (CPU) executing programs, a memory including, for example, a RAM and a ROM, and storing programs and data, and an input and output (I/O) bus inputting and outputting electrical signals.

The engine controller 100 receives at least a signal from an air flow sensor 71, which indicates the intake flow rate, a crank angle pulse signal from a crank angle sensor 72, an accelerator opening signal from an accelerator opening sensor 73, which detects the stepped amount of the accelerator pedal, and a vehicle speed signal from a vehicle speed sensor 74. Based on these input signals, the engine controller 100 calculates parameters for controlling the engine 1 such as a desired throttle opening signal, a fuel injection pulse, an ignition signal, a valve phase angle signal, etc. Then, the engine controller 100 outputs the signals to the throttle valve 20 (specifically, a throttle actuator operating the throttle valve 20), the fuel supply system 34 (specifically, the electrical circuit), the ignition system 32, the VVT mechanism 23, etc.

The engine 1 has a geometric compression ratio $\epsilon$ ranging from 18 to 40, both inclusive. In particular, the geometric compression ratio $\epsilon$ preferably ranges from 25 to 35, both inclusive. In the engine 1 of this embodiment, the compression ratio is equal to the expansion ratio. Thus, the engine 1 has a high compression ratio and a relatively high expansion ratio at the same time. A configuration (e.g., the Atkinson cycle or the Miller cycle) may be employed, in which the compression ratio is equal to or lower than the expansion ratio.

As shown in FIG. 1, the combustion chamber 17 is segmented by the wall surface of the cylinder 11, the top surface of the piston 15, the lower surface (i.e., the ceiling surface) of the cylinder head 13, and the surfaces of the intake valve 21 and the exhaust valve 22 at the valve head. These surfaces are provided with the heat insulating layers 61, 62, 63, 64, and 65, respectively, to reduce cooling loss. This insulates the combustion chamber 17 from heat. In the following description, the heat insulating layers 61-65 are collectively referred to "heat insulating layers" with reference numeral 6 added. The heat insulating layers 6 may be provided on whole or part of the segmenting surfaces. In the example figure, the heat insulating layer 61 on the wall surface of the cylinder is located at a higher position than piston rings 14 when the piston 15 is located at the top dead center, thereby preventing the piston rings 14 from sliding along the heat insulating layer 61. The heat insulating layer 61 on the wall surface of the cylinder is not limited to this structure. The heat insulating layer 61 may extend downward. As a result, the heat insulating layer 61 may be provided in whole or part of the area corresponding to the stroke of the piston 15. Although not the wall surfaces directly segmenting the combustion chamber 17, the wall surfaces of the intake ports 18 and the exhaust ports 19 may be provided with heat insulating layers near the openings at the ceiling surface of the combustion chamber 17. The thicknesses of the heat insulating layers 61-65 shown in FIG. 1 are not the actual ones but mere examples, which do not indicate the magnitude relations among the heat insulating layers.

The heat insulating structure of the combustion chamber 17 will be described in detail. As described above, the heat insulating structure of the combustion chamber 17 includes the heat insulating layers 61-65 provided on the segmenting surfaces which segment the combustion chamber 17. These heat insulating layers 61-65 have lower thermal conductivity than a metal base member of the combustion chamber 17 to prevent the heat of the combustion gas within the combustion chamber 17 from being released through the segmenting surfaces. The base member of the heat insulating layer 61 provided on the wall surface of the cylinder 11 is the cylinder block 12. The base member of the heat insulating layers 62 provided on the top surface of the piston 15 is the piston 15. The base member of the heat insulating layer 63 provided on the ceiling surface of the cylinder head 13 is the cylinder head 13. The base members of the heat insulating layers 64 and 65 provided on the valve head surfaces of the intake valve 21 and the exhaust valve 22 are the intake valve 21 and the exhaust valve 22, respectively. Therefore, as the materials of the base members, the cylinder block 12, the cylinder head 13, and the piston 15 are made of an aluminum alloy or cast iron, and the intake valve 21 and the exhaust valve 22 are made of heat resistant steel, cast iron, etc.

The heat insulating layers 6 preferably have lower volumetric specific heat than the base members to reduce the cooling loss. Specifically, the gas temperature within the combustion chamber 17 changes in accordance with the progress of the combustion cycle. In a conventional engine without the heat insulating structure of the combustion chamber 17, cooling water flows in a water jacket formed in a cylinder head and a cylinder block. This maintains the temperature of the surfaces segmenting the combustion chamber 17 substantially constant, regardless of the progress of the combustion cycle.

On the other hand, the cooling loss is determined by the following equation.

Cooling Loss=Heat Transfer Coefficient×Heat Transfer Area×(Gas Temperature−Temperature of Segmenting Surfaces)

Thus, with an increase in the difference between the gas temperature and the temperature of the wall surfaces, the cooling loss increases. It is preferable to reduce the difference between the gas temperature and the temperature of the wall surfaces to reduce the cooling loss. If the cooling water maintains the temperature of the segmenting surfaces of the combustion chamber 17 substantially constant, an increase in the temperature difference is inevitable in accordance with a change in the gas temperature. Thus, the thermal capacity of the heat insulating layers 6 is preferably reduced so that the temperature of the segmenting surfaces of the combustion chamber 17 change in accordance with a change in the gas temperature within the combustion chamber 17.

The heat insulating layers 6 may be formed by coating a ceramic material such as $ZrO_2$ on the base member by plasma splay coating. The ceramic material may contain numbers of pores. This reduces the heat transfer coefficient and the volumetric specific heat of the heat insulating layers 6.

In this embodiment, as shown in FIG. 1, an aluminum titanate port liner 181 with a significantly low heat transfer coefficient, excellent heat insulating characteristics, and excellent heat resistance are integrally casted in the cylinder head 13, thereby providing the heat insulating layers in the intake ports 18. This reduces and avoids a temperature rise of the fresh air due to the heat received from the cylinder head 13 in passing through the intake ports 18. This reduces the temperature of the fresh air (i.e., the initial gas temperature) introduced into the cylinder 11 to reduce the gas temperature in the combustion. This is advantageous in reducing the difference between the gas temperature and the temperature of the segmenting surfaces of the combustion chamber 17. The reduction in the gas temperature in the combustion may reduce the heat transfer coefficient, which is advantageous in reducing the cooling loss. The structure of the heat insulating layer provided in each intake port 18 is not limited to the cast of the port liner 181.

This engine 1 includes the heat insulating layers, which are gas layers, in the cylinder (i.e., in the combustion chamber 17) in addition to the heat insulating structures of the combustion chamber 17 and the intake ports 18, thereby largely reducing the cooling loss.

Specifically, the engine controller 100 outputs the injection signal to the electrical circuit of the fuel supply system 34 to inject the fuel into the cylinder from the nozzle port 41 of the injector 33 in a compression stroke so that a gas layer containing the fresh air is formed in the outer periphery of the cylinder (i.e., the combustion chamber 17) of the engine 1 and an air-fuel mixture layer is formed in the central portion. Specifically, in the compression stroke, the fuel is inject into the cylinder using the injector 33, and the penetration of the fuel spray is reduced to a size (i.e., a length) that the fuel spray does not reach the outer periphery of the cylinder. As a result, the air-fuel mixture layer is formed in the central portion in the cylinder, and the gas layer containing the fresh air is formed around the air-fuel mixture layer. This gas layer may contain only the fresh air, or may contain burnt gas (i.e., EGR gas) in addition to the fresh air. No problem occurs if the gas layer contains a small amount of the fuel. The gas layer needs to have a leaner air-fuel ratio than the air-fuel mixture layer to function as a heat insulating layer.

As described above, ignition (or assistance of the auto-ignition combustion) using the spark plug 31 in performed with the gas layer and the air-fuel mixture layer formed. Then, the gas layer between the air-fuel mixture layer and the wall surfaces of the cylinder 11 prevents contact between the flame of the air-fuel mixture layer and the wall surfaces of the cylinder 11. The gas layer serves as a heat insulating layer to reduce release of heat from the wall surfaces of the cylinder 11. As a result, the cooling loss largely decreases.

In this engine 1, as described above, the geometric compression ratio $\epsilon$ ranges from 18 to 40, both inclusive. In the Otto cycle, which is the theoretical cycle, the theoretical thermal efficiency $\eta_{th}$ is expressed by the equation $\eta_{th}=1-1/(\epsilon^{\kappa-1})$. The theoretical thermal efficiency $\eta_{th}$ increases with the increasing compression ratio $\epsilon$. Also, the theoretical thermal efficiency $\eta_{th}$ increases with the increasing heat ratio κ of gas, in other words, the excess air ratio λ.

However, the indicated thermal efficiency of engines (specifically, engines without any heat insulating structure in combustion chambers) peaks at a predetermined geometric compression ratio ε (e.g., about 15). Even if the geometric compression ratio ε further increases, the indicated thermal efficiency does not increase, but on the contrary, decreases. This is because the combustion pressure and the combustion temperature increase with the increasing compression ratio, when the geometric compression ratio increases while maintaining the fuel amount and the intake amount constant. As described above, as the combustion pressure and the combustion temperature increase, the cooling loss also increases.

By contrast, in the engine 1, the heat insulating structure of the combustion chamber 17 is combined as described above so that the indicated thermal efficiency increases at a high geometric compression ratio ε. That is, the cooling loss is reduced by allowing the combustion chamber 17 have heat insulating characteristics, thereby increasing the indicated thermal efficiency.

On the other hand, the heat insulating characteristics of the combustion chamber 17 for reducing the cooling loss do not simply contribute to an improvement in the indicated thermal efficiency, since the reduced cooling loss is converted to the exhaust loss. In the engine 1, as described above, an increase in the expansion ratio in accordance with an increase the compression ratio efficiently converts the energy of the combustion gas corresponding to the reduced cooling loss to mechanical work. In short, the engine 1 largely improves the indicated thermal efficiency by employing the structure reducing the cooling loss and the exhaust loss.

Within a low load operation range, in which the engine has a predetermined or smaller load, the excess air ratio λ of the entire cylinder (the entire combustion chamber 17) is set to two or higher, or the gas-to-fuel weight ratio G/F in the cylinder is set to 30 or higher. As a result, the heat insulating layer insulates heat in the low load operation range to improve the indicated thermal efficiency while reducing RawNOx.

Where the excess air ratio λ is lower than two, the maximum combustion temperature in the combustion chamber 17 increases, thereby discharging RawNOx from the combustion chamber 17. As described above, since the engine 1 reduces the exhaust loss as well as the cooling loss, the exhaust temperature is relatively low, which is disadvantageous in activating the catalyst. Thus, the discharge of RawNOx from the combustion chamber 17 is preferably reduced and avoided. Therefore, the excess air ratio λ is preferably two or higher. In view of reducing RawNOx, the excess air ratio λ is preferably equal to or higher than 2.5. In other words, the excess air ratio λ preferably falls within the range where the maximum combustion temperature in the combustion chamber 17 is equal to or lower than a predetermined temperature (e.g., 1800 K as a temperature capable of generating RawNOx). The engine controller 100 preferably increases the excess air ratio λ to operate the engine 1, for example, when the maximum combustion temperature exceeds the predetermined temperature with an increase in the load in a partial load operation range of the engine 1 (i.e., with a decrease in the excess air ratio λ due to an increase in the amount of the fuel injection).

According to the study of the present inventors, the indicated thermal efficiency peaks at the excess air ratio λ of eight. The excess air ratio λ preferably falls within the range of $\lambda \leq \lambda \leq 8$ (more preferably $2.5 \leq \lambda \leq 8$). The leaner air-fuel mixture opens the throttle valve 20, and thus contributes to an improvement in the indicated thermal efficiency caused by reduction in gas exchange loss (i.e., the pumping loss).

On the other hand, in a high load operation range including a full load operation range of the engine 1, the excess air ratio λ is further reduced to, for example, $\lambda=1$ or $\lambda \leq 1$.

Figure 3:
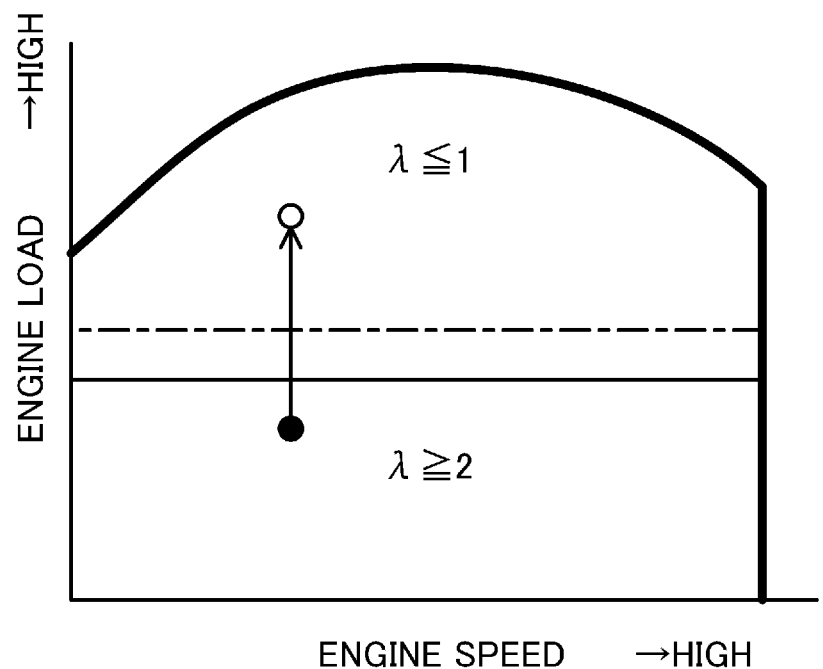
FIG. 3 is an example operation map of the engine.

FIG. 3 illustrates an example operation map when the engine 1 is warm. As described above, in FIG. 3, the excess air ratio λ falls within a lean operation range expressed by $\lambda \leq \lambda \leq 8$ (or G/F ranging from 30 to 120) in a low load operation range in which the engine has a load lower than the predetermined load indicated by the solid line. On the other hand, the excess air ratio falls within a $\lambda \leq 1$ range expressed by $\lambda \leq 1$ in the high load operation range (including the full load range) in which the engine has a load equal to or higher than the predetermined load. Thus, a three-way catalyst can be used in the high load operation range. The predetermined load may increase with an increase in the engine speed, or may be constant regardless of the engine speed.

The engine 1 includes the auto-ignition combustion operation range allowing the auto-ignition combustion of the fuel injected into the cylinder by the injector 33. In this example, the auto-ignition combustion operation range includes the entire low load operation range, and the high load operation range except for the full load operation range and its periphery. The range is however not limited thereto.

When engine 1 falls within the high load operation range of the auto-ignition combustion operation range, the engine controller 100 sets the start time of the fuel injection using the injector 33 within a period from a terminal stage of the compression stroke to the compression top dead center. In this embodiment, as shown at the lower stage of FIG. 4, the fuel injection starts at the terminal stage of the compression stroke.

When the engine 1 is in a high load operation range, the engine controller 100 performs plasma ignition using the spark plug 31 to apply energy to the fuel injected into the cylinder by the time of the plasma ignition to assist the auto-ignition combustion of the fuel. This raises the temperature of the fuel applied with the energy, thereby igniting the fuel. This ignited fuel serves as a trigger to successively ignite the fuel, which will be injected later. At a specific crank angle, an increase rate of the in-cylinder pressure ($\Delta P/\Delta \theta$), which is the ratio of a change in the in-cylinder pressure ($\Delta P$) to a change in the crank angle ($\Delta \theta$) in motoring the engine, reaches a negative maximum value. The energy is applied in the period from the start of the fuel injection to an initial stage of the expansion stroke (near the compression top dead center in this embodiment) such that the time of the specific crank angle overlaps a combustion period (what is called the main combustion period), in which the combustion mass percentage of the fuel ranges from 10% to 90%, both inclusive.

The energy is preferably applied such that the time when the combustion mass percentage of the fuel is 10% comes after the compression top dead center (i.e., the main combustion period starts after the compression top dead center).

Figure 5:
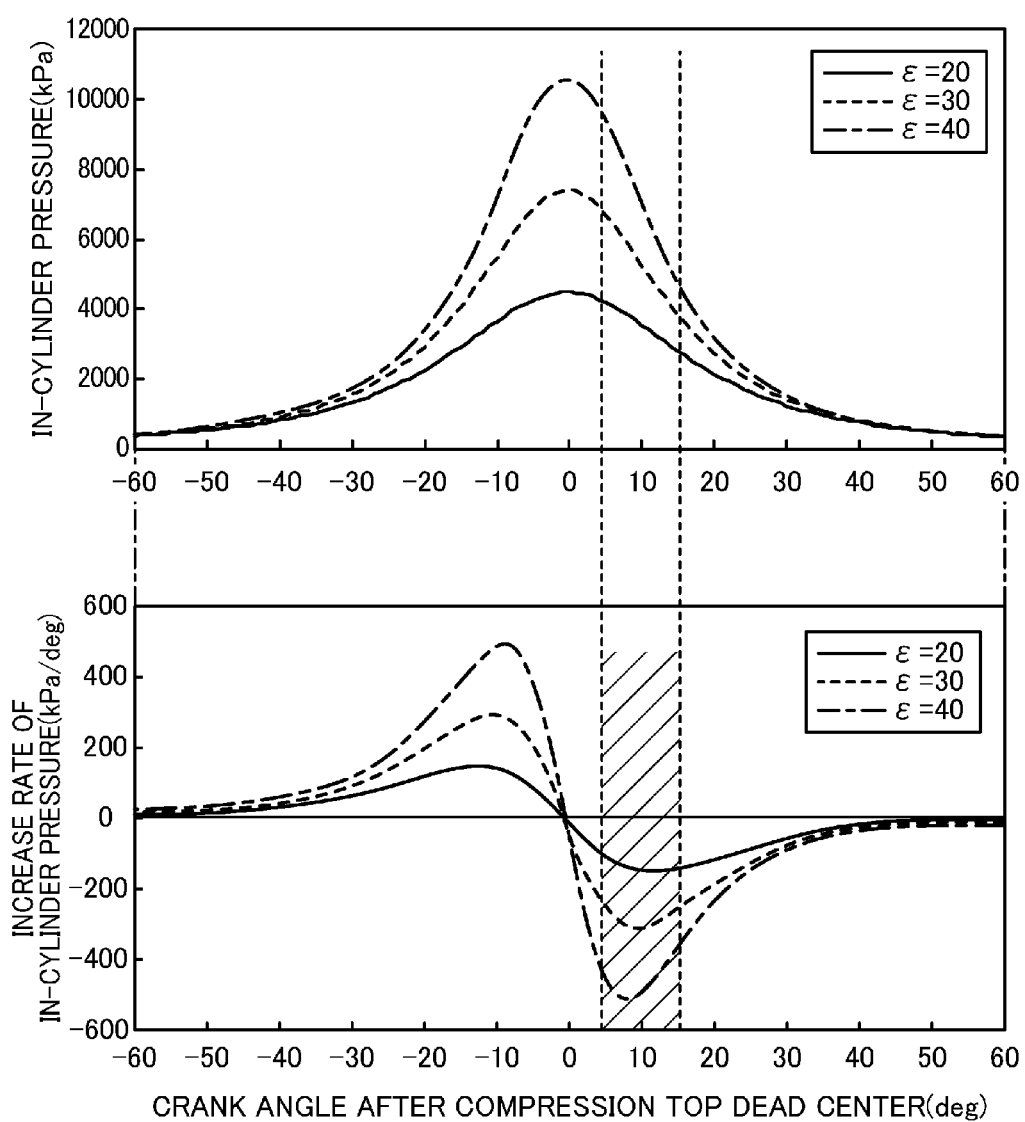
FIG. 5 is a graph illustrating a change in the in-cylinder pressure (at the upper stage) and a change in the increase rate of the in-cylinder pressure (at the lower stage) in motoring the engine, where the engine has geometric compression ratios of 20, 30, and 40.

As shown in the graph at the lower stage of FIG. 5, the increase rate of the in-cylinder pressure in the motoring reaches a maximum value before the compression top dead center, zero at the compression top dead center, a negative value after the compression top dead center, and the negative maximum value (the minimum value) soon. As clear from the upper stage of FIG. 5, the time of the crank angle when the increase rate of the in-cylinder pressure in the motoring has the negative maximum value changes in accordance with a difference in the geometric compression ratio ϵ in engines of the same engine displacement. Where the geometric compression ratio ϵ ranges from 18 to 40, both inclusive, the crank angle, at which the increase rate of the in-cylinder pressure reaches the negative maximum value, falls within the range from 4° CA to 15° CA after the compression top dead center (i.e., the hatched range at the lower stage of FIG. 5).

Figure 6:
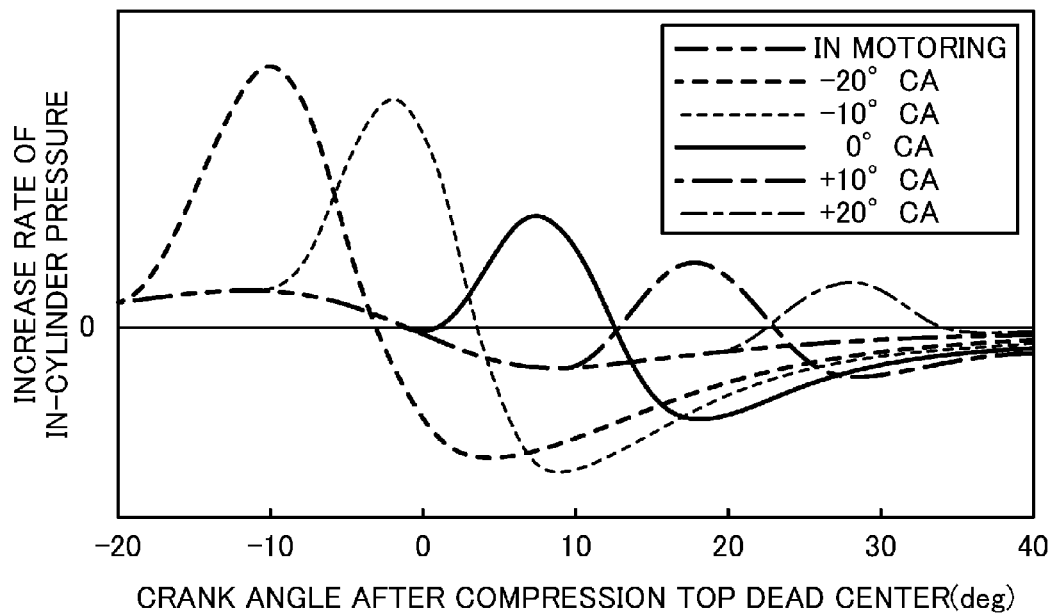
FIG. 6 is a graph illustrating a result of studying how the increase rate of the in-cylinder pressure in combustion is changed by changing the combustion start time where the engine has a geometric compression ratio of 40.

FIG. 6 illustrates a result of studying how the increase rate of the in-cylinder pressure in combustion varies with a change in the combustion start time. (The geometric compression ratio ϵ here is 40.) The combustion start times are set to the following five patterns. 20° CA before the compression top dead center (i.e., −20° CA), 10° CA before the compression top dead center (i.e., −10° CA), the compression top dead center (i.e., 0° CA), 10° CA after the compression top dead center (i.e., +10° CA), and 20° CA after the compression top dead center (i.e., +20° CA). The double dashed line indicates the increase rate of the in-cylinder pressure in the motoring. If the combustion starts before the compression top dead center, the increase rate of the in-cylinder pressure in the combustion has a great maximum value, since the combustion occurs at a crank angle where the increase rate of the in-cylinder pressure in the motoring is great. On the other hand, if the combustion starts at the compression top dead center, the combustion occurs at a crank angle where the increase rate of the in-cylinder pressure in the motoring is small. This significantly reduces the maximum value of the increase rate of the in-cylinder pressure in the combustion as compared to the case where the combustion starts before the compression top dead center. If the combustion starts much later than the compression top dead center, the maximum value of the increase rate of the in-cylinder pressure in the combustion is small. This is however due to deterioration in the combustion efficiency. Therefore, as described above, energy is applied to the fuel injected into the cylinder within the period from the start of the fuel injection to the initial stage of the expansion stroke such that the time of the crank angle when the increase rate of the in-cylinder pressure in the motoring reaches the negative maximum value overlaps the main combustion period.

In particular, the fuel injection is preferably performed as follows, when the engine 1 is within the high load operation range in the operation map of FIG. 3. Specifically, as shown at the lower stage of FIG. 4, first injection injecting a predetermined amount of the fuel is performed from the start of the fuel injection to the periphery of the compression top dead center (TDC). As will be described later, the predetermined amount, which is the amount of the fuel injection in the first injection, is preferably set to relatively small such that the ratio of the predetermined amount to the total injected fuel is 1 or lower mass %. Thus, the lift amount of the outward opening valve 42 in the first injection is much smaller than the lift amount of the outward opening valve 42 in below-described second injection (except for the initial stage of the second injection). This reduces the penetration of the fuel spray. The fuel injected by the first injection is located near the tip portion of the spark plug 31 as a fine air-fuel mixture mass.

After the first injection, the second injection injecting the remaining fuel is performed continuously after the first injection. The initial stage of this second injection is near the compression top dead center, and the time of assisting the auto-ignition combustion, as will be described later. At this time, the lift amount of the outward opening valve 42 is smaller than that in the first injection. Then, the lift amount of the outward opening valve 42 rapidly increases to inject all the remaining fuel.

Figure 4:
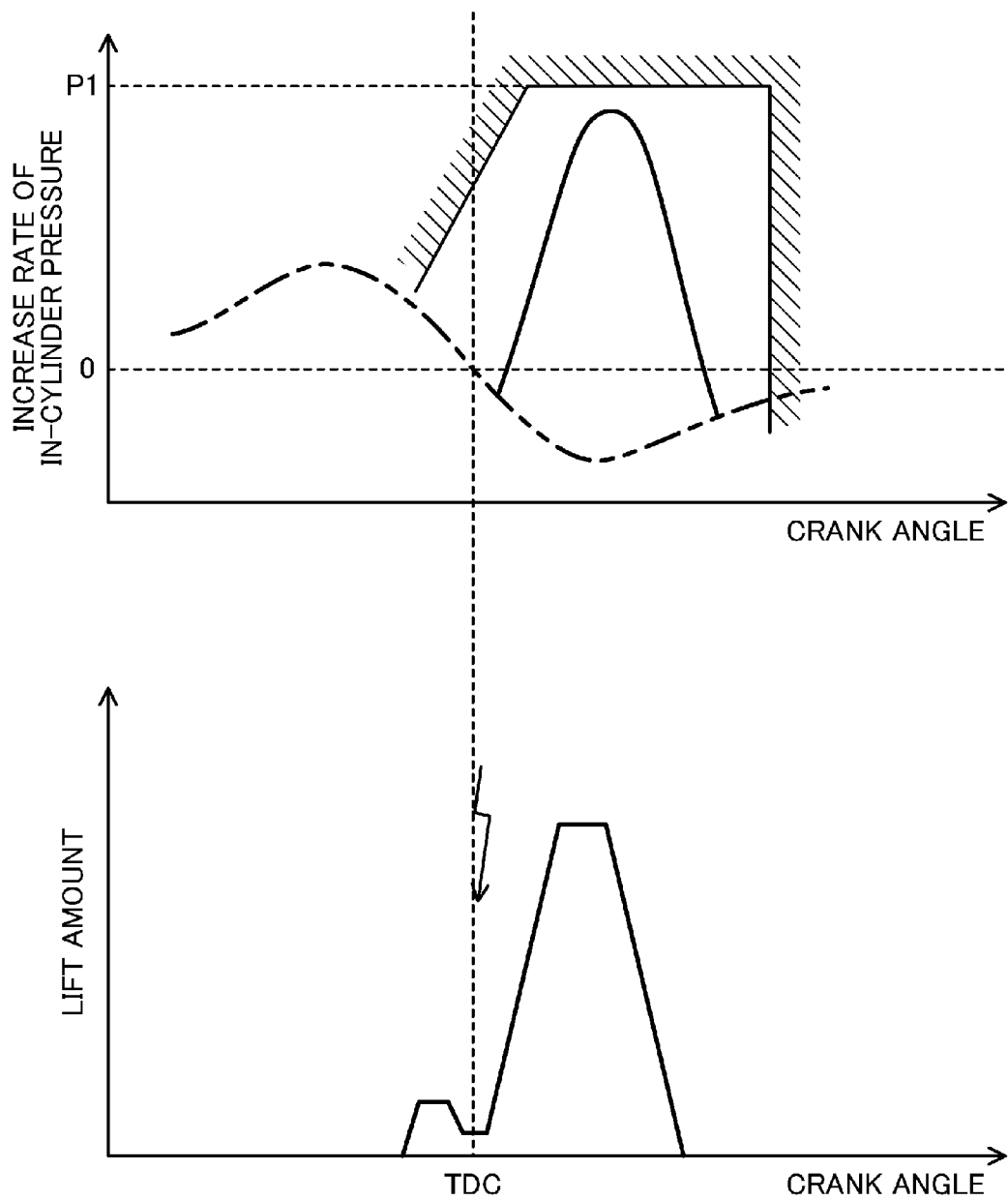
FIG. 4 is a graph illustrating a change in the lift amount of an outward opening valve (at the lower stage), and a change in the increase rate of in-cylinder pressure (at the upper stage) relative to a crank angle.

As shown by the arrow at the lower stage of FIG. 4, the engine controller 100 applies energy to the fuel (i.e., a fine air-fuel mixture mass) for the first injection by plasma ignition using the spark plug 31 in the period from a terminal stage of the first injection to an initial stage of the second injection (near the compression top dead center (i.e., the initial stage of the second injection) in this example). This assists the auto-ignition combustion of the fuel by the first injection and the second injection. As such, plasma ignition is performed at the initial stage of the second injection (i.e., before large amount injection), thereby intensively applying the energy to the fine air-fuel mixture mass. This rapidly raises the temperature of the fine air-fuel mixture mass to cause ignition immediately after the compression top dead center. This fine air-fuel mixture mass serves as a trigger of ignition to successively ignite the fuel for the subsequent second injection. As a result, the increase rate of the in-cylinder pressure in the combustion changes as indicated by the solid line in the graph at the upper stage of FIG. 4. (The double dashed line indicates the increase rate of the in-cylinder pressure in the motoring.)

In the graph at the upper stage of FIG. 4, this embodiment prevents the curved line indicating a change in the increase rate of the in-cylinder pressure in the combustion from entering the hatched range. Specifically, if the increase rate of the in-cylinder pressure in the combustion exceeds P1, the noise, vibration, and harshness (NVH) level becomes higher. If the combustion occurs too late, the combustion efficiency degrades. If the combustion occurs too early, a rise in the pressure and the temperature in the cylinder deteriorates the emission efficiency and the combustion efficiency. However, this embodiment lowers the noise, vibration, and harshness (NVH) level, and reduces deterioration in the emission and the combustion efficiency without causing such problems.

The energy needed for igniting the fuel for the first injection (i.e., the fine air-fuel mixture mass) at a delayed time after the predetermined crank angle from the start of the energy application increases with a decrease in the predetermined crank angle. If the predetermined crank angle is constant, the mass ratio of the predetermined amount to the total injected fuel is proportional to the needed energy. That is, as the amount of the fuel for the first injection (i.e., the above-described predetermined amount) increases, great energy is needed for igniting the fine air-fuel mixture mass. On the other hand, the applicable energy by plasma ignition ranges from 100 mJ to 200 mJ. In view of this range, where the predetermined crank angle is, for example, about 5° CA, the ratio of the predetermined amount to the total injected fuel is preferably 1 mass % or less. If energy is applied by spark ignition, the applicable energy is about 35 mJ, and thus the ratio of the predetermined amount to the total injected fuel is preferably 0.3 mass % or less.

As such, when the engine 1 is in the auto-ignition combustion operation range, the start time of the fuel injection is set within the period from the terminal stage of the compression stroke to the compression top dead center. Energy is applied to the fuel injected into the cylinder within the period from the start of the fuel injection to the initial stage of the expansion stroke such that the time of the specific crank angle when the increase rate of the in-cylinder pressure in motoring the engine reaches the negative maximum value overlaps the main combustion period when the combustion mass percentage of the fuel ranges from 10% to 90%, both inclusive. This assists the auto-ignition combustion of the fuel. As a result, the increase rate of the in-cylinder pressure in the combustion decreases, thereby lowering the noise, vibration, and harshness (NVH) level.

While being continuous from the first injection, the second injection may be discontinuous from the first injection. Specifically, the first injection and the second injection may be separated. In this case, as well, energy may be applied to the fuel for the first injection by plasma ignition (or spark ignition) using the spark plug 31 within the period from the terminal stage of the first injection to the initial stage of the second injection. (Note that the initial stage of the second injection needs to be the initial stage of the expansion stroke.) Energy is more preferably applied between the first injection and the second injection.

Figure 7:
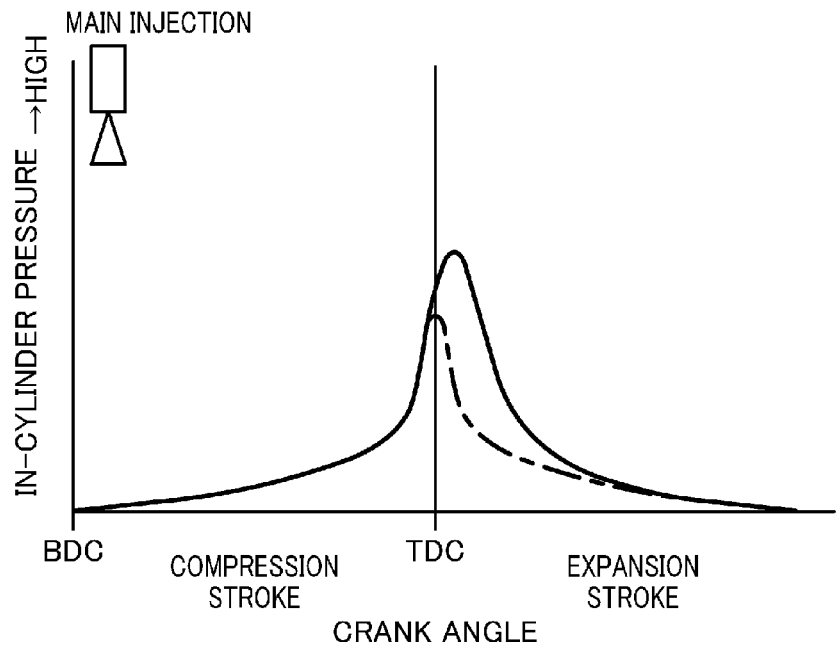
FIG. 7 illustrates an example change in the in-cylinder pressure in the combustion in a low load operation range at an excess air ratio of $\lambda \geq 2$.

Next, transition control in accordance with a change in the operation range of the engine 1 will be described. As shown in the operation map of FIG. 3, a low load operation range at an excess air ratio $\lambda \geq 2$ is, as described above, the auto-ignition combustion range. The fuel injected into the cylinder 11 by the injector 33 is compressed and ignited. FIG. 7 illustrates an example change in the in-cylinder pressure in the low load operation range. The engine controller 100 sets the time of the fuel injection (i.e., the main injection) using the injector 33 to, for example, first half of the compression stroke or an intake stroke. The time of the fuel injection may be changed as appropriate in accordance with the load of the engine. This forms a relatively homogenous air-fuel mixture, which is compressed and ignited near the compression top dead center. In FIG. 7, the dashed line indicates a change in the in-cylinder pressure in the motoring.

Figure 8:
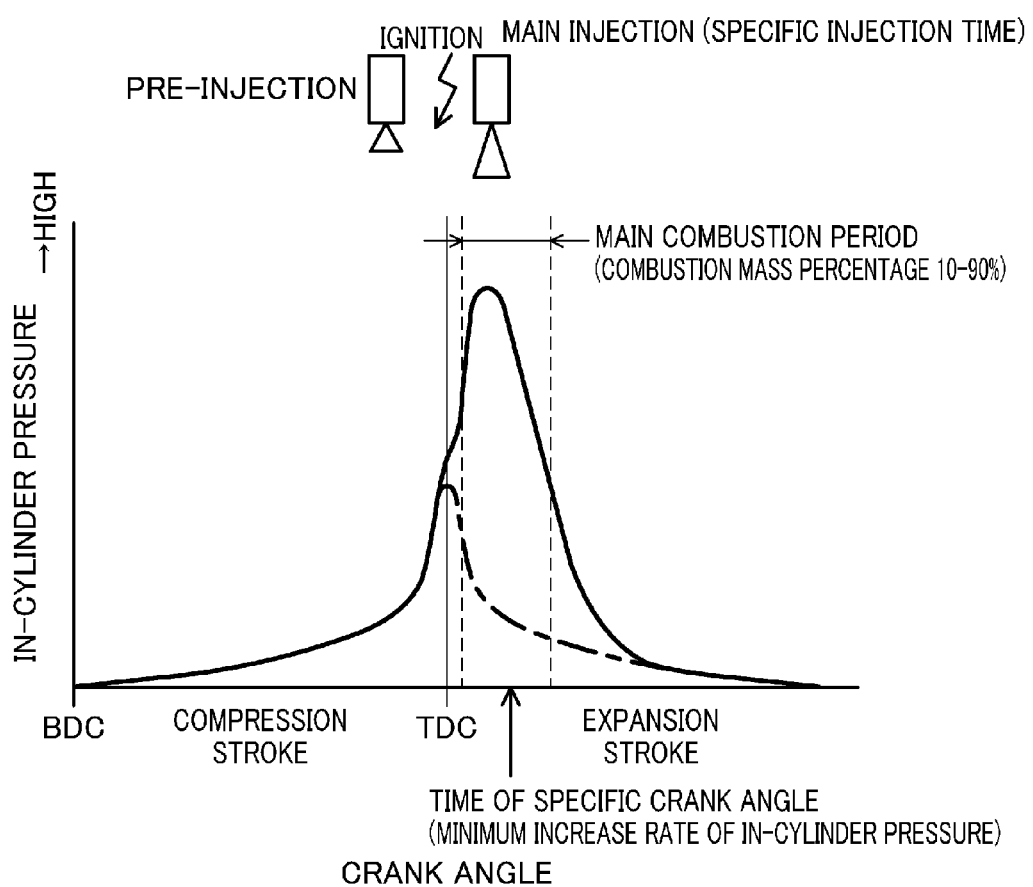
FIG. 8 illustrates an example change in the in-cylinder pressure in the combustion in a high load operation range at an excess air ratio of $\lambda \leq 1$.

On the other hand, as shown in FIG. 8, in a high load operation range at an excess air ratio $\lambda \leq 1$, the engine controller 100 sets the time of the main injection using the injector 33 to a specific injection time around the compression top dead center. Before the main injection, the engine controller 100 executes pre-injection, which starts within the period from the terminal stage of the compression stroke to compression top dead center. In the high load operation range, the engine controller 100 performs plasma ignition using the spark plug 31 after the pre-injection to apply energy to the fuel injected into the cylinder by the time of the plasma ignition to assist the auto-ignition combustion of the fuel. The mode of the fuel injection and the plasma ignition correspond to the mode of the fuel injection and the ignition assistance, which has been described with reference to the lower stage of FIG. 4. The above-described "pre-injection" corresponds to the first injection, and the "main injection" corresponds to the second injection.

Thus, energy is applied to the fuel injected by the pre-injection by ignition assistance to raising the temperature of the fuel, thereby igniting the fuel. This ignition fuel serves as a trigger to successively ignite the fuel, which will be injected in the subsequent main injection. As described above, the energy is applied within the period from the start of the fuel injection to the initial stage of the expansion stroke such that the main combustion period includes the time of the specific crank angle. In other words, the time of the main injection is set such that the main combustion period includes the time of the specific crank angle. As a result, as described above, in the high load operation range, the maximum value of the increase rate of the in-cylinder pressure in the combustion decreases to reduce the combustion noise and improve the NVH performance.

In the operation map of FIG. 3, the excess air ratio $\lambda$ needs to rapidly change from $\lambda \geq 2$ to $\lambda \leq 1$, when the operational state shifts, for example, from the low load operation range indicated by the black circle to the high load operation range indicated by the white circle as shown by the arrow in response to the acceleration request by the accelerator operation. In the low load operation range at the excess air ratio $\lambda \geq 2$, the throttle valve 20 is fully open, and the control for reducing the intake amount is delayed. Thus, the amount of the fuel injection is increased to change the excess air ratio $\lambda$ to $\lambda \leq 1$. However, in this case, the torque rapidly changes to cause torque shock and degradation in the NVH performance. The engine 1 is a particularly high-compression ratio engine, and thus tends to case torque shock and significant degradation in the NVH performance.

Figure 9:
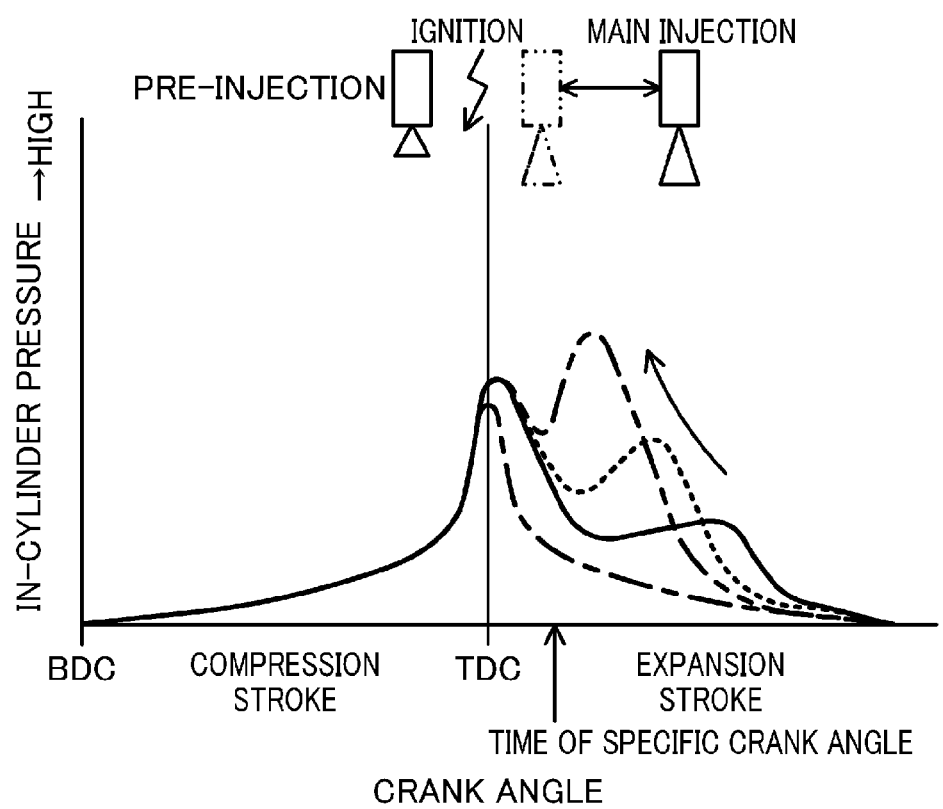
FIG. 9 illustrates an example change in the in-cylinder pressure in the combustion at the transition between the low load operation range and the high load operation range.

This engine 1 performs transition control in transition between the low load operation range and the high load operation range. This reduces torque shock and degradation in the NVH performance. Specifically, as shown in FIG. 9, as the transition control, the engine controller 100 sets the excess air ratio to $\lambda \leq 1$, and delays the time of the main injection using the injector 33 from the specific injection time around the compression top dead center, which is the time of injection in the high load operation range. This retards the main combustion period relative to the specific crank angle when the increase rate of the in-cylinder pressure reaches the negative maximum value (see the solid line of FIG. 9).

The pre-injection is also performed in the transition control. Similar to the pre-injection in the high load operation range, the pre-injection is set within the period from the terminal stage of the compression stroke to the compression top dead center. After the pre-injection, the engine controller 100 further performs plasma ignition using the spark plug 31 to apply energy to the fuel injected into the cylinder by the time of the plasma ignition.

In this transition control, the main combustion period is retarded relative to the specific crank angle. This largely delays the main combustion period in the expansion stroke, thereby reducing the combustion efficiency. If the amount of the fuel injection increases and the excess air ratio is set to $\lambda \leq 1$, a small amount of torque is generated.

On the other hand, since the time of the main injection is delayed to retard the main combustion period, this example is disadvantageous in the ignition characteristics and the combustion stability. The pre-injection, which starts within the period from the terminal stage of the compression stroke to the compression top dead center, and the subsequent plasma ignition maintain the temperature and the pressure in the cylinder high, even after the compression top dead center. This reliably compresses and ignites the fuel injected by the main injection to secure the combustion stability of the main combustion.

In FIG. 3, as in the transition from the black circle to the white circle, assume that the operational state of the engine 1 shifts from the low load operation range to the high load operation range in response to the accelerator operation. Immediately after the operational state of the engine 1 enters the high load operation range, in other words, at the start of the transition control, the time of the main injection is preferably set such that the brake mean effective pressure (BMEP) has the same pressure-indicating waveform as that in the operational state in the low load operation range before the start of the transition control (see the pressure-indicating waveform indicated by the solid line of FIG. 9). Then, in FIG. 9, as shown by the pressure-indicating waveforms indicated by the broken line and the dashed line, the time of the main injection is gradually advanced such that the main combustion period is advanced relative to the specific crank angle. This reduces torque shock and gradually increases the torque. Eventually, the time of the main injection is set such that the main combustion period includes the time of the specific crank angle, thereby ending the transition control. That is, the transition to the high load operation range is complete (see FIG. 8).

Figure 10:
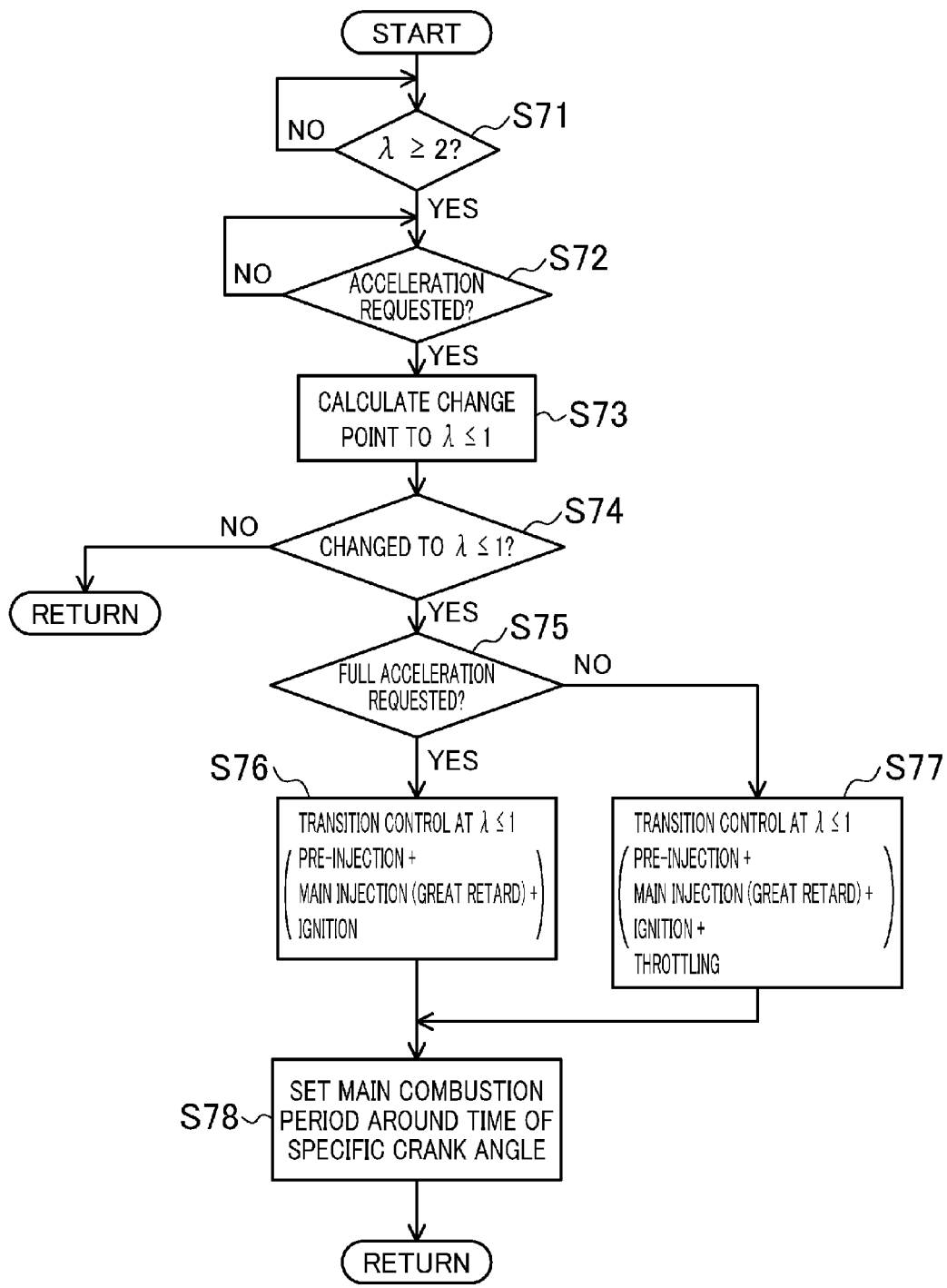
FIG. 10 is a flow chart illustrating transition control at the transition from the low load operation range to the high load operation range.

Then, the transition control executed by the engine controller 100 will be described with reference to the flow chart of FIG. 10. This flow chart shows the transition control when the operational state of the engine 1 shifts from the low load operation range to the high load operation range in response to the accelerator operation.

First, at step S71 after the start, whether or not the excess air ratio λ satisfies the expression λ≥2 is determined. That is, whether or not the operational state of the engine is in the low load operation range is determined. When the determination in the step S71 is YES, the process goes to step S72.

In the step S72, whether or not acceleration is requested by accelerator operation is determined. When acceleration is requested (YES), the process goes to step S73.

In the step S73, the operational state being a transition target is assumed based on parameters such as the step-in amount of the accelerator and the engine speed to calculate a change point to the excess air ratio of λ≤1. Then, in subsequent step S74, whether or not there is a change point to the excess air ratio of λ≤1 is determined. Where there is no change point, in other words, where the engine does not shift to the high load operation range and remains in the low load operation range, the process returns. Where there is a change point, in other words, where the engine shifts from the low load operation range to the high load operation range, the process goes to step S75.

In the step S75, whether or not full acceleration is requested is determined. Where full acceleration is requested, that is, where the operational state of the engine 1 eventually reaches the full load range within in the high load operation range, the process goes to step S76. On the other hand, where no full acceleration is requested, that is, where the operational state of the engine 1 eventually reaches a point within the high load operation range with a load lower than a full load (e.g., the load reaches the point indicated by the white circle), the process goes to step S77.

In the step S76, the above-described transition control is executed. Specifically, the pre-injection, and the main injection delayed from the specific injection time are executed. In addition, plasma ignition is executed between the pre-injection and the main injection. Immediately after the engine shifts to the high load operation range at the excess air ratio of λ≤1, the excess air ratio is set to λ≤1, and the generated torque is reduced to reduce torque shock and degradation in the NVH performance. In the step S76, the time of the main injection is gradually advanced, thereby gradually improving the torque.

On the other hand, in the step S77, in which no full acceleration is requested, the transition control similar to the transition control in the step S76 is executed. In addition, throttling control, i.e., control for reducing the intake amount by adjusting the opening degree of the throttle valve 20 is performed. In the low load operation range before the transition of the operational state, lean combustion at the excess air ratio of λ≥2 is performed, and thus the throttle valve 20 is fully open. In the full acceleration, the throttle valve 20 is fully open even in the full load range after the transition of the operational state, thereby requiring no adjustment of the opening degree of the throttle valve 20. In reaching a point with a load lower than the full load after the transition of the operational state, the opening degree of the throttle valve 20 is reduced to correspond to the amount of the fuel injection set in accordance with the load. That is, in the step S77, the opening degree of the throttle valve 20 is reduced after the end of the transition control. The reduction in the opening degree of the throttle valve 20 starts during the transition control, thereby reducing the amount of the fuel injection during the transition control to improve the fuel efficiency.

Similar to the step S76, in the step S77, the time of the main injection is gradually advanced to increase the torque.

When the transition control ends at the step S76 and the step S77, the time of the main injection is set in the step S78 such that the main combustion period includes the time of the specific crank angle. Then, the transition to the high load operation range is complete.

As such, the transition control is interposed in the transition when the operational state of the engine shifts from the low load operation range to the high load operation range, thereby securing the emission performance at the excess air ratio of λ≤1, and reducing torque shock and degradation in the NVH performance.

On the other hand, in the transition when the operational state of the engine shifts from the high load operation range to the low load operation range, the inversion of the above-described process may be executed. Specifically, in the transition control in the transition from the high load operation range to the low load operation range, the time of the main injection is set such that the brake mean effective pressure (BMEP) has almost the same pressure-indicating waveform as in the operational state in the high load operation range before the start of the transition control, for example, as shown by the pressure-indicating waveform indicated by the dashed line in FIG. 9. Then, in FIG. 9, as shown by the pressure-indicating waveforms indicated by the broken line and the solid line, the time of the main injection is gradually delayed such that the main combustion period is retarded relative to the specific crank angle. This reduces torque shock and gradually reduces the torque. When the load (i.e., the torque) is reduced to the level where the excess air ratio of λ≥2, the transition control ends, and the transition to the low load operation range is complete.

As indicated by the dashed line of FIG. 3, the transition control preferably starts based on the load higher than the predetermined load at the boundary between the low load operation range and the high load operation range. That is, the transition control in the transition from the high load operation range to the low load operation range may be preferably performed immediately before entering the low load operation range. This allows the transition to the low load operation range without reducing the low load operation range at the excess air ratio of λ≥2, which is advantageous in improving the energy efficiency.

As such, the transition control is interposed in the transition when the operational state of the engine shifts from the high load operation range to the low load operation range, thereby securing the emission performance at the excess air ratio of λ≤1, and reducing torque shock and degradation in the NVH performance.

The above-described example employs the heat insulating structures of the combustion chamber 17 and the intake ports 18, and includes gas layers as heat insulating layers in the cylinder (i.e., in the combustion chamber 17). However, the present disclosure may be applicable to engines without any heat insulating structure of the combustion chamber 17 and the intake ports 18, and engines without gas layers as heat insulating layers.

The above-described embodiment is illustrative only and should not be taken as limiting the scope of our invention.

All equivalents, changes, and modifications that come within the spirit of the inventions as defined by the following claims are desired to be protected.

INDUSTRIAL APPLICABILITY

The present disclosure is useful for direct injection gasoline engines having an auto-ignition combustion operation range which allows auto-ignition combustion of fuel injected into a cylinder by an injector and containing at least gasoline.

DESCRIPTION OF REFERENCE CHARACTERS

1 Direct Injection Gasoline Engine
11 Cylinder
31 Spark Plug (Ignition assistance section)
33 Injector
100 Engine Controller (Injection control section) (Ignition assistance section)

The invention claimed is:

1. A direct injection gasoline engine having an auto-ignition combustion operation range allowing auto-ignition combustion of fuel injected into a cylinder by an injector and containing at least gasoline, the engine having a geometric compression ratio ranging from 18 to 40, both inclusive, the engine comprising:
an injection control section configured to control fuel injection of the injector; and
an ignition assistance section configured to apply energy to the fuel injected into the cylinder by the injector to assist the auto-ignition combustion of the fuel, when the engine is within the auto-ignition combustion operation range, wherein
when the engine is within the auto-ignition combustion operation range, the injection control section sets a start time of the fuel injection within a period from a terminal stage of a compression stroke to a compression top dead center, and
the ignition assistance section applies the energy to the fuel injected into the cylinder in a period from start of the fuel injection to an initial stage of an expansion stroke such that a time of a specific crank angle ranging from 4° CA to 15° CA after the compression top dead center when an increase rate of in-cylinder pressure, which is a ratio of a change in the in-cylinder pressure to a change in a crank angle in motoring the engine, reaches a negative maximum value overlaps a main combustion period when a combustion mass percentage of the fuel ranges from 10% to 90%, both inclusive.

2. The direct injection gasoline engine of claim 1, wherein the ignition assistance section applies the energy to the fuel injected into the cylinder such that a time when the combustion mass percentage of the fuel is 10% comes after the compression top dead center.

3. The direct injection gasoline engine of claim 1, wherein when the engine is within the auto-ignition combustion operation range, the injection control section performs first injection injecting a predetermined amount of the fuel, and performs second injection injecting remaining fuel continuously or discontinuously after the first injection, and
the ignition assistance section applies the energy to the fuel for the first injection within a period from a terminal stage of the first injection to an initial stage of the second injection.

4. The direct injection gasoline engine of claim 1, wherein the ignition assistance section applies the energy to the fuel injected into the cylinder by plasma ignition.

5. The direct injection gasoline engine of claim 1, wherein the injection control section
sets an excess air ratio λ in combustion to two or higher, when the engine is within a low load operation range with a load lower than a predetermined load, and
sets the excess air ratio λ in the combustion to one or lower, and sets the fuel injection using the injector within a specific injection time around the compression top dead center such that the main combustion period includes the time of the specific crank angle, when the engine is within a high load operation range with a load higher than the predetermined load, and
the injection control section executes transition control setting the excess air ratio λ in the combustion to one or lower, and delaying the fuel injection from the specific injection time such that the main combustion period is retarded relative to the specific crank angle, in transition when the engine shifts between the low load operation range and the high load operation range.

6. The direct injection gasoline engine of claim 5, wherein when the engine is within the high load operation range, the injection control section sets the start time of the fuel injection within the period from the terminal stage of the compression stroke to the compression top dead center, and
the ignition assistance section applies the energy to the fuel injected into the cylinder within the period from the start of the fuel injection to the initial stage of the expansion stroke to allow the auto-ignition combustion of the fuel.

7. The direct injection gasoline engine of claim 5, wherein in the transition control, the injection control section allows the injector to execute pre-injection starting within the period from the terminal stage of the compression stroke to the compression top dead center, and main injection after the pre-injection behind the specific injection time.

8. The direct injection gasoline engine of claim 7, wherein the ignition assistance section applies the energy to the fuel injected into the cylinder between the pre-injection and the main injection.

9. The direct injection gasoline engine of claim 5, wherein the injection control section executes the transition control in transition when the engine shifts from the low load operation range to a full load range within the high load operation range, and
control for reducing an intake amount is performed while the injection control section executes the transition control in transition when the engine shifts from the low load operation range to a point of the high load operation range with a load lower than a full load.

10. A method of controlling a direct injection gasoline engine including a cylinder set at a geometric compression ratio ranging from 18 to 40, both inclusive, and configured to directly inject fuel containing at least gasoline into the cylinder, the method comprising:
starting fuel injection into the cylinder in a period from a terminal stage of a compression stroke to a compression top dead center;
applying energy to the fuel injected into the cylinder in a period from start of the fuel injection to an initial stage of an expansion stroke such that a time of a specific crank angle ranging from 4° CA to 15° CA after the compression top dead center when an increase rate of in-cylinder pressure, which is a ratio of a change in the in-cylinder pressure to a change in a crank angle in motoring the engine, reaches a negative maximum value overlaps a main combustion period when a combustion mass percentage of the fuel ranges from 10% to 90%, both inclusive; and allowing auto-ignition combustion of the fuel injected into the cylinder.

11. The method of claim 10, further comprising:

operating the engine such that an excess air ratio $\lambda$ in combustion is two or higher, when the engine is within a low load operation range with a load lower than a predetermined load;

operating the engine such that the excess air ratio $\lambda$ in the combustion is one or lower, and such that the main combustion period includes the time of the specific crank angle by setting the fuel injection into the cylinder within a specific injection time around the compression top dead center, when the engine is within a high load operation range with a load higher than the predetermined load; and operating the engine such that the main combustion period is retarded relative to the specific crank angle by executing transition control setting the excess air ratio $\lambda$ in the combustion to one or lower, and delaying the fuel injection from the specific injection time, in transition when the engine shifts between the low load operation range and the high load operation range.

12. The method of claim 11, further comprising:

setting the start time of the fuel injection within the period from the terminal stage of the compression stroke to the compression top dead center, when the engine is within the high load operation range; and applying the energy to the fuel injected into the cylinder within the period from the start of the fuel injection to the initial stage of the expansion stroke to allow the auto-ignition combustion of the fuel.

13. The method of claim 11, further comprising:

in the transition control, executing, as the fuel injection into the cylinder, pre-injection starting within the period from the terminal stage of the compression stroke to the compression top dead center, and main injection after the pre-injection behind the specific injection time; and applying the energy to the fuel injected into the cylinder between the pre-injection and the main injection.

14. The method of claim 11, further comprising:

executing the transition control in transition when the engine shifts from the low load operation range to a full load range within the high load operation range; and performing control for reducing an intake amount during the transition control in transition when the engine shifts from the low load operation range to a point of the high load operation range with a load lower than a full load.

* * * * *